March 11, 1952 A. E. GOODMAN ET AL 2,588,825
NONBLURRABLE REAR-VISION MIRROR
Filed June 28, 1950
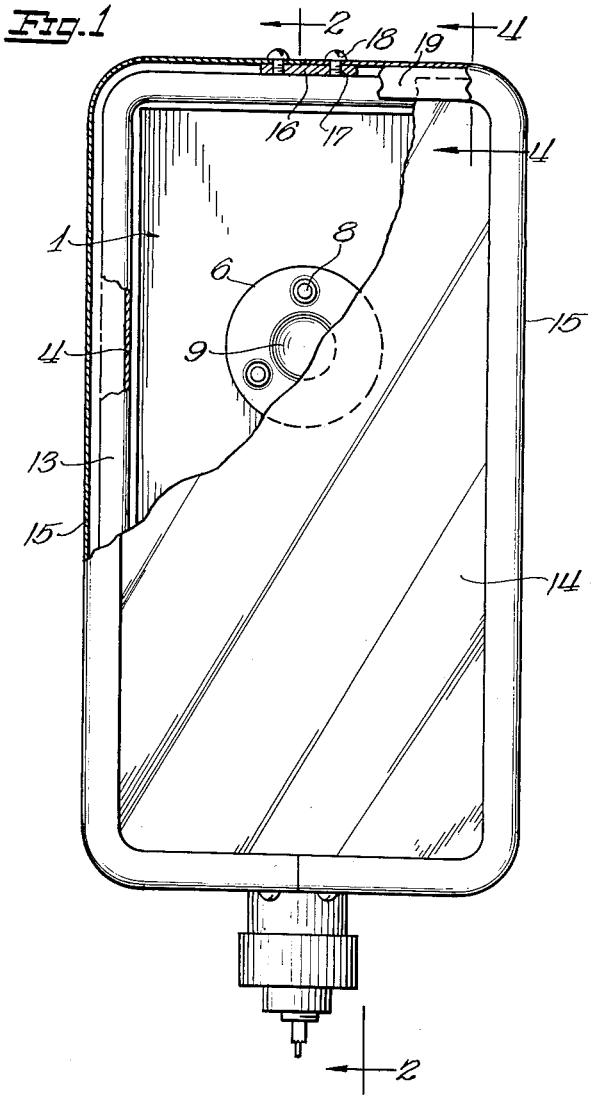
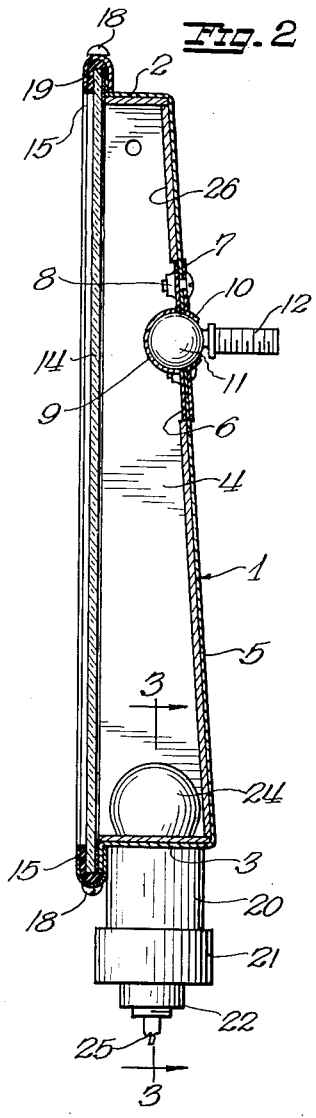
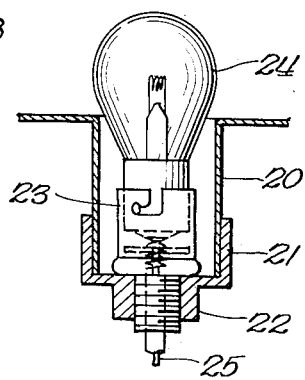
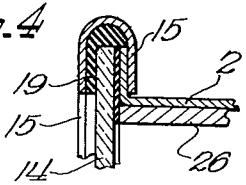
ALFRED E. GOODMAN
LEWIS R. BROWN
INVENTORS
BY James L. Givnan
ATT'Y Patented Mar. 11, 1952

2,588,825

UNITED STATES PATENT OFFICE 2,588,825

NONBLURRABLE REAR-VISION MIRROR

Alfred E. Goodman and Lewis R. Brown, Pasco, Wash.

Application June 28, 1950, Serial No. 170,746

1 Claim. (Cl. 219—19)

This invention relates to improvements in rear view mirrors especially adapted for use on trucks, automobiles and other vehicles and mounted on the exterior of the cab or body of the vehicles.

It is one of the principal objects of the invention to provide a mirror of this character and a housing with heat generating means on the interior of the housing so that the entire mirror or reflecting surface will partake of the temperature of the heat or warmth within the housing and thereby prevent the accumulation of mist, fog or frost on the reflecting surface.

A further object is the provision of a mirror of this kind which is of compact and neat appearing formation and of only slightly greater thickness than conventional rear view mirrors.

These and other objects will appear as our invention is more fully hereinafter described in the following specification, illustrated in the accompanying drawing and finally pointed out in the appended claims.

In the drawing:

Figure 1 is an elevation of a mirror made in accordance with our invention and with fragments broken away for convenience of illustration.

Figure 2 is a sectional elevation taken approximately along the line 2—2 of Figure 1.

Figures 3 and 4 are sectional detail views taken respectively on the lines 3—3 of Figure 2 and 4—4 of Figure 1.

Referring now more particularly to the drawing:

In Figures 1 and 2 reference numeral 1 indicates, generally, a housing preferably made of sheet metal having integrally formed top and bottom walls 2 and 3 respectively, side walls 4 and a back wall 5. To the back wall 5 we provide a supporting and adjusting means in the form of a pair of discs 6 and 7 secured by nuts and bolts to the back wall and centrally formed with co-operating socket portions 9 and 10 within which is disposed for universal movement a ball 11 formed with a threaded extension 12 adapted for threaded engagement with a supporting arm or any other support carried by the vehicle and which does not form a part of this invention. By this arrangement the housing and mirror unit may be conveniently adjusted into any position to meet the requirements of the driver of the vehicle.

The top, bottom and side walls are flanged outwardly as at 13 to form a support or backing for a mirror 14 which also serves as a closure or front wall for the housing 1. The mirror is held to the flanges of the housing by means of a rim 15 of inverted U-shape in cross section. The rim is made in 2 sections as best illustrated in Figure 1 and their inner abutting ends are securely held together in a tight clamping position about the edges of the mirror by means of a block 16 having threaded apertures 17 formed therein to receive screws 18. Surrounding the edges of the mirror and disposed within the rim sections is a gasket 19 made of rubber, or any other suitable packing material to render the interior of the housing 1 water-tight.

The bottom wall 3 of the housing may either be formed integral with or have secured thereto a downwardly extending cylindrical portion 20 closed at its bottom end by a cap 21 having a downwardly extending internally threaded extension 22 to form a support for any approved type of socket 23 to receive an electric light bulb 24. One side of the socket may be grounded and the other side connected by wire 25 with the lighting circuit of the vehicle in more or less the conventional manner. To insulate the interior of the housing 1 we line the top, bottom, side walls and back wall with asbestos or any other suitable insulating material as indicated at 26.

While we have shown a particular form of embodiment of our invention, we are aware that many minor changes therein will readily suggest themselves to others skilled in the art without departing from the spirit and scope of the invention. Having thus described our invention, what we claim as new and desire to protect by Letters Patent is:

A rear vision mirror comprising in combination a housing having integrally formed top, bottom, rear and side walls, said side walls being tapered throughout their length from the bottom to the top of the housing, a layer of heat insulating material secured to the inside of said top, bottom, rear and side walls of the housing, a mirror secured in water-tight relation to the housing to form the front wall thereof, a light bulb disposed within the housing and extending through said bottom wall thereof and connected with a source of electrical energy whereby energization of said light bulb and the warmth generated thereby within the housing will dissipate the accumulation of mist, fog or frost on the reflecting surface on said mirror.

ALFRED E. GOODMAN.
LEWIS R. BROWN.

REFERENCES CITED

The following references are of record in the file of this patent:

UNITED STATES PATENTS

| Number | Name | Date |
|---|---|---|
| Re. 18,937 | Oestnaies et al. | Sept. 5, 1933 |
| 758,382 | Prahar | Apr. 26, 1904 |
| 1,279,091 | Doolittle | Sept. 17, 1918 |
| 1,741,562 | Faguy | Dec. 31, 1929 |
| 2,103,384 | Somohano | Dec. 28, 1937 |
| 2,149,598 | Girl et al. | Mar. 7, 1939 |
| 2,202,697 | Hodny | May 28, 1940 |
| 2,457,639 | Brooks | Dec. 28, 1948 |